US007000459B2

(12) United States Patent
Riddering et al.

(10) Patent No.: US 7,000,459 B2
(45) Date of Patent: Feb. 21, 2006

(54) STRAIN SENSOR PATTERNED ON MEMS FLEX ARMS

(75) Inventors: Jason W. Riddering, Prior Lake, MN (US); Wayne A. Bonin, North Oaks, MN (US); Zine-Eddine Boutaghou, North Oaks, MN (US); Roger L. Hipwell, Jr., Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 271 days.

(21) Appl. No.: 10/463,775

(22) Filed: Jun. 17, 2003

(65) Prior Publication Data

US 2004/0007076 A1 Jan. 15, 2004

Related U.S. Application Data

(60) Provisional application No. 60/394,808, filed on Jul. 10, 2002.

(51) Int. Cl.
G01B 5/28 (2006.01)
(52) U.S. Cl. ........................................................ 73/105
(58) Field of Classification Search ................ 73/105, 73/865.9, 774, 775, 862.628, 862.632, 862.633, 73/862.634
See application file for complete search history.

(56) References Cited

U.S. PATENT DOCUMENTS

| 4,141,253 | A | * | 2/1979 | Whitehead, Jr. .............. 73/727 |
| 4,331,035 | A | * | 5/1982 | Eisele et al. .................... 73/765 |
| 4,522,072 | A | * | 6/1985 | Sulouff et al. ................. 73/765 |
| 4,979,580 | A | * | 12/1990 | Lockery ..................... 177/211 |
| 4,987,505 | A | | 1/1991 | Iwabuchi et al. ........... 360/103 |
| 5,097,584 | A | | 3/1992 | Cain et al. ..................... 29/407 |
| 5,142,770 | A | | 9/1992 | Cain et al. ..................... 29/705 |
| 5,682,780 | A | | 11/1997 | Girard ......................... 72/16.2 |
| 5,687,597 | A | | 11/1997 | Girard ......................... 72/21.4 |
| 5,758,406 | A | | 6/1998 | Hunsaker et al. ........ 29/603.06 |
| 5,832,763 | A | | 11/1998 | Girard ......................... 72/16.3 |
| 5,832,764 | A | | 11/1998 | Girard ......................... 72/16.3 |
| 5,915,271 | A | * | 6/1999 | Berg et al. ..................... 73/105 |
| 6,073,484 | A | | 6/2000 | Miller et al. .................. 73/105 |
| 6,237,215 | B1 | | 5/2001 | Hunsaker et al. ............. 29/759 |
| 6,512,367 | B1 | | 1/2003 | Liu et al. ..................... 324/210 |
| 2002/0039876 | A1 | | 4/2002 | Ekstrum et al. .............. 451/41 |
| 2002/0071196 | A1 | | 6/2002 | Chapin et al. ................ 360/75 |
| 2002/0105750 | A1 | | 8/2002 | Li et al. ....................... 360/75 |
| 2003/0002183 | A1 | | 1/2003 | Fioravanti .................... 360/25 |
| 2003/0057804 | A1 | | 3/2003 | Uchiyama et al. .......... 310/311 |

OTHER PUBLICATIONS

"Thin Film Resistive Sensors," Institute of Physics Publishing, Briston, Philadelphia and New York, Edited by P. Ciureanu and S. Middelhoek, pp. 170-175.

* cited by examiner

Primary Examiner—Robert Raevis
(74) Attorney, Agent, or Firm—Westman, Champlin & Kelly

(57) ABSTRACT

A micromechanical assembly couples to a positioning member and to a body having an aerodynamic surface subject to aerodynamic forces. The micromechanical assembly comprises a substrate including a flexible beam joining a first substrate portion that is attachable to the positioning member to a second substrate portion that is attachable to the body. The substrate includes a substrate surface extending at least over the flexible beam. A lithographic pattern is formed on the substrate surface. The lithographic pattern includes at least a first impedance element that senses flexing of the flexible beam. Contact pads are coupled to the lithographic pattern for coupling to a flex measurement circuit.

31 Claims, 16 Drawing Sheets

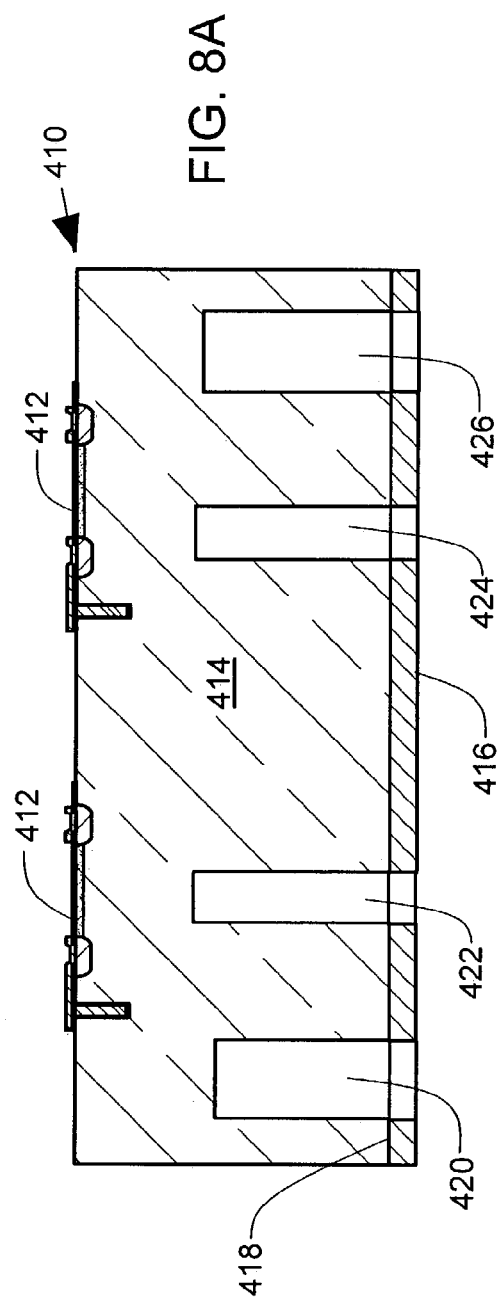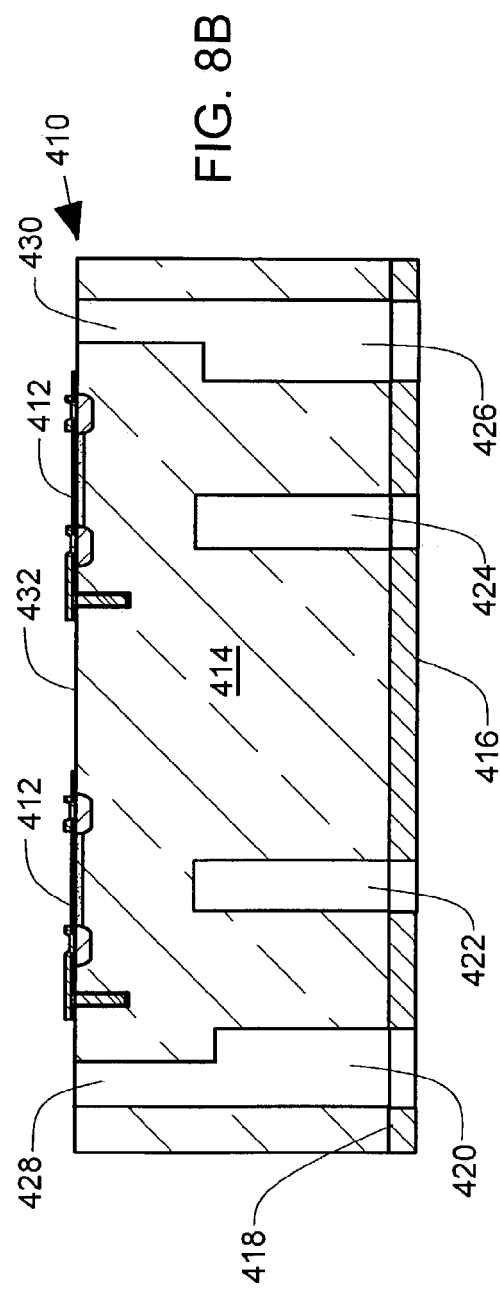

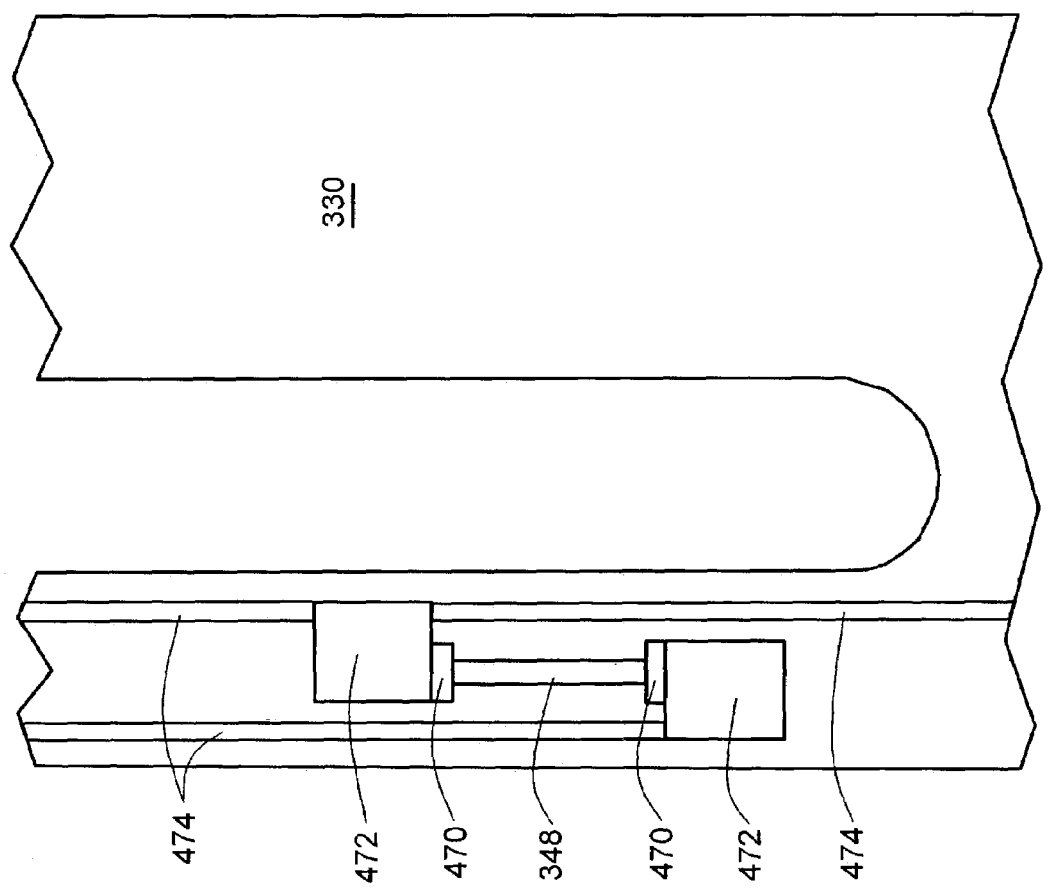

STRAIN SENSOR PATTERNED ON MEMS FLEX ARMS

CROSS-REFERENCE TO RELATED APPLICATION

This application claims the benefit of U.S. Provisional Application No. 60/394,808 filed on Jul. 10, 2002 for inventors Jason Wayne Riddering, Wayne Allen Bonin, Zine-Eddine Boutaghou and entitled "In-situ force measurement and contact detection using suspension integrated piezoresistive sensors."

FIELD OF THE INVENTION

The present invention relates generally to micromechanical assemblies, and more particularly but not by limitation to micromechanical assemblies that sense strain.

BACKGROUND OF THE INVENTION

As fly heights in disc drives become smaller, accurate characterization of the inputs to air bearing simulation programs become more and more critical in achieving agreement between modeling results and fly height measurements. Suspension preload, pitch torque, and roll torque are among the inputs to air bearing simulation that need to be characterized. Accurate characterization of these forces presents a problem because they are a function of how the suspension is loaded. Currently, these forces are measured on a specially designed tester and then fly height measurements are made on a different tester. If the suspension is not loaded in exactly the same way on the two testers, then the preload, pitch torque, and roll torque will be different. The ideal situation would be to measure the loads while the head is flying on the fly height measurement tester.

A separate issue with lower fly heights is the characterization of the disc glide height and glide avalanche. The disc glide height is defined as the height at which a head starts to hit isolated asperities. The disc glide avalanche is defined as the height at which the head cannot fly any lower because it is continually in contact with the peaks on the disc. Typically the glide height and glide avalanche are measured using acoustic emission (AE) sensors. A significant problem that arises is interpretation of the AE sensor output. Many frequencies are present and it is not always clear which frequencies relate to contact and which frequencies relate simply to flying. Also, due to the very high frequencies that are usually associated with contact, the sensor, filter, and acquisition system may not be sensitive enough to detect light contact associated with an isolated asperity or the initial point of avalanche.

Embodiments of the present invention provide solutions to these and other problems, and offer other advantages over the prior art.

SUMMARY OF THE INVENTION

Disclosed are embodiments of a micromechanical assembly couplable to a positioning member and to a body having an aerodynamic surface subject to aerodynamic forces. The micromechanical assembly comprises a substrate including a flexible beam joining a first substrate portion that is attachable to the positioning member to a second substrate portion that is attachable to the body. The substrate includes a substrate surface extending at least over the flexible beam. A lithographic pattern is formed on the substrate surface. The lithographic pattern includes at least a first impedance element that senses flexing of the flexible beam. Contact pads are coupled to the lithographic pattern for coupling to a flex measurement circuit.

Other features and benefits that characterize embodiments of the present invention will be apparent upon reading the following detailed description and review of the associated drawings.

BRIEF DESCRIPTION OF THE DRAWINGS

FIGS. 8A–8B illustrate reactive ion etch process steps in shaping a micromechanical device.
FIG. 10 illustrates an enlarged plan view of a strain gage formed on a micromechanical device.

DETAILED DESCRIPTION OF ILLUSTRATIVE EMBODIMENTS

Figure 1:
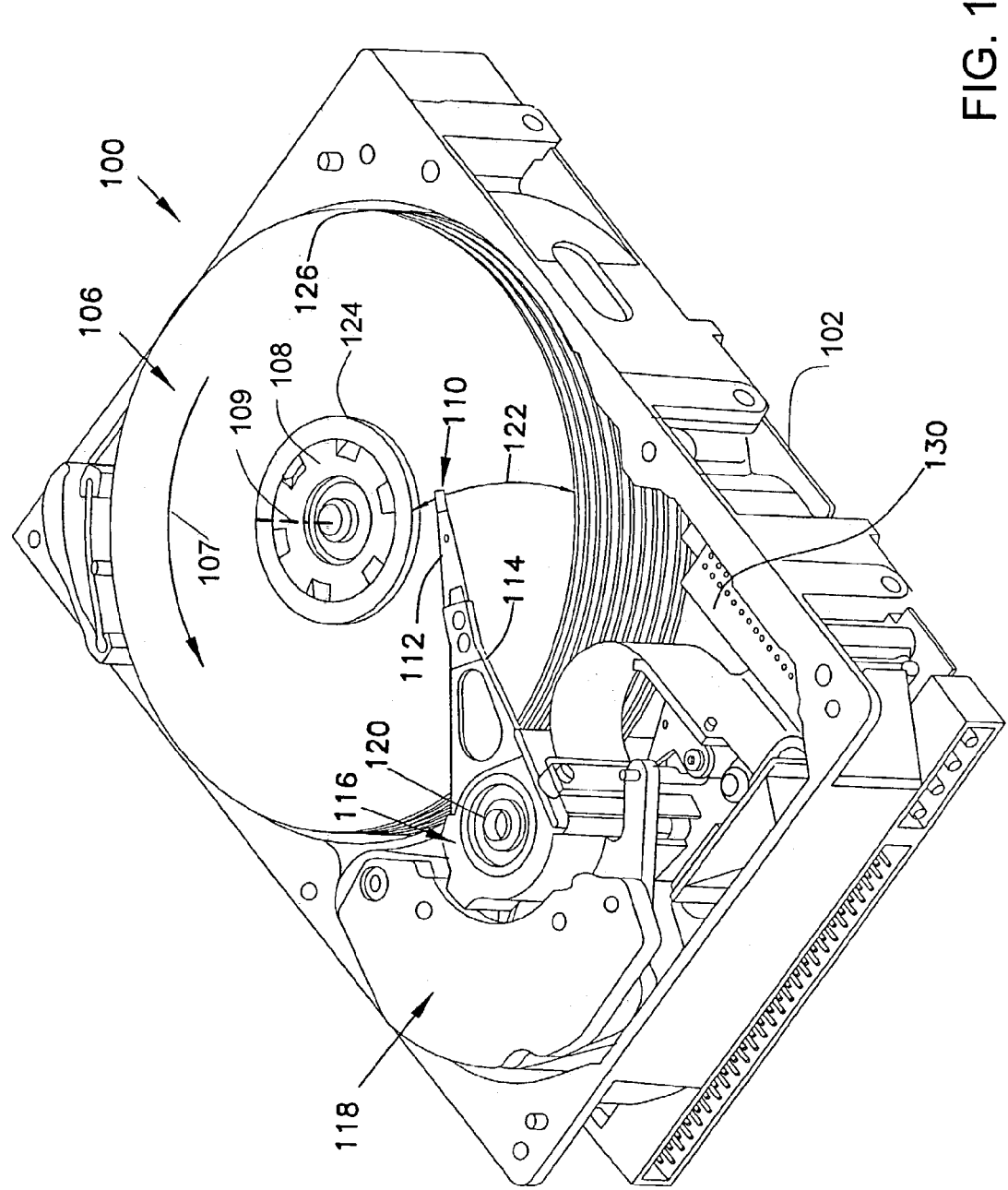
FIG. 1 illustrates an oblique view of a disc drive.

FIG. 1 illustrates an oblique view of a disc drive 100. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109 in a direction indicated by arrow 107. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown). The suspension 112 is explained in more detail below in connection with an example illustrated in FIGS. 2–5.

Figure 2:
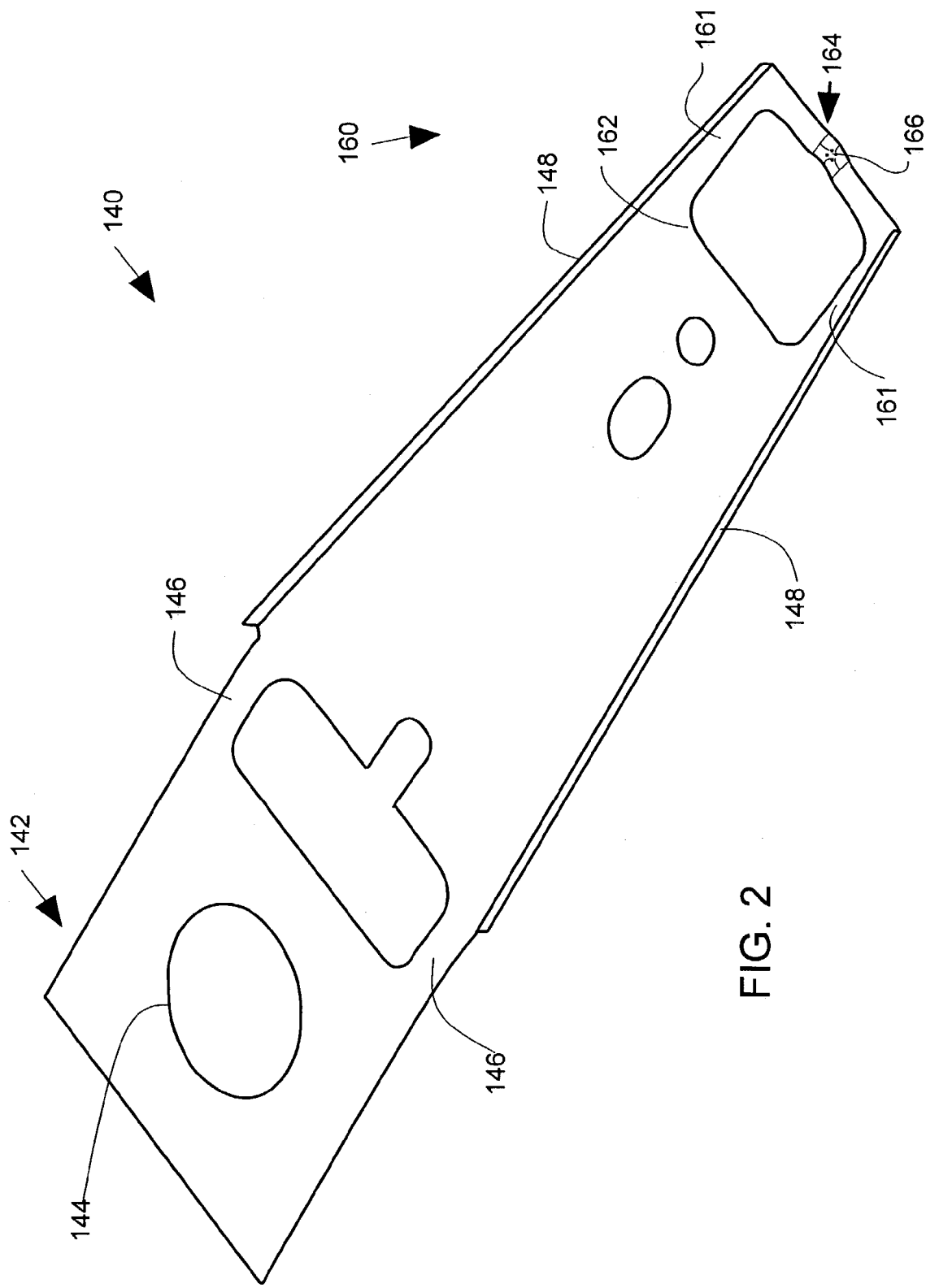
FIG. 2 illustrates a top oblique view of a load beam.

FIG. 2 illustrates a top oblique view of a beam 140. Beam 140 functions as a load beam that applies a mechanical load to a read/write head. The beam 140 is preferably formed of stainless steel and extends from a first end 142 that includes a mounting hole 144 to a second end 160 that includes a window frame 162 and a preload dimple 166 in a gimbal region 164. The beam 140 includes preload spring regions 146, which generate the preload force that is applied at the preload dimple 166. The main body of the beam 140 includes side rails 148 that extend alongside the window frame 162. Flat sections 161 on the sides of the window frame 162 join with the side rail 148 to form forming margins for the beam 140.

Figure 3:
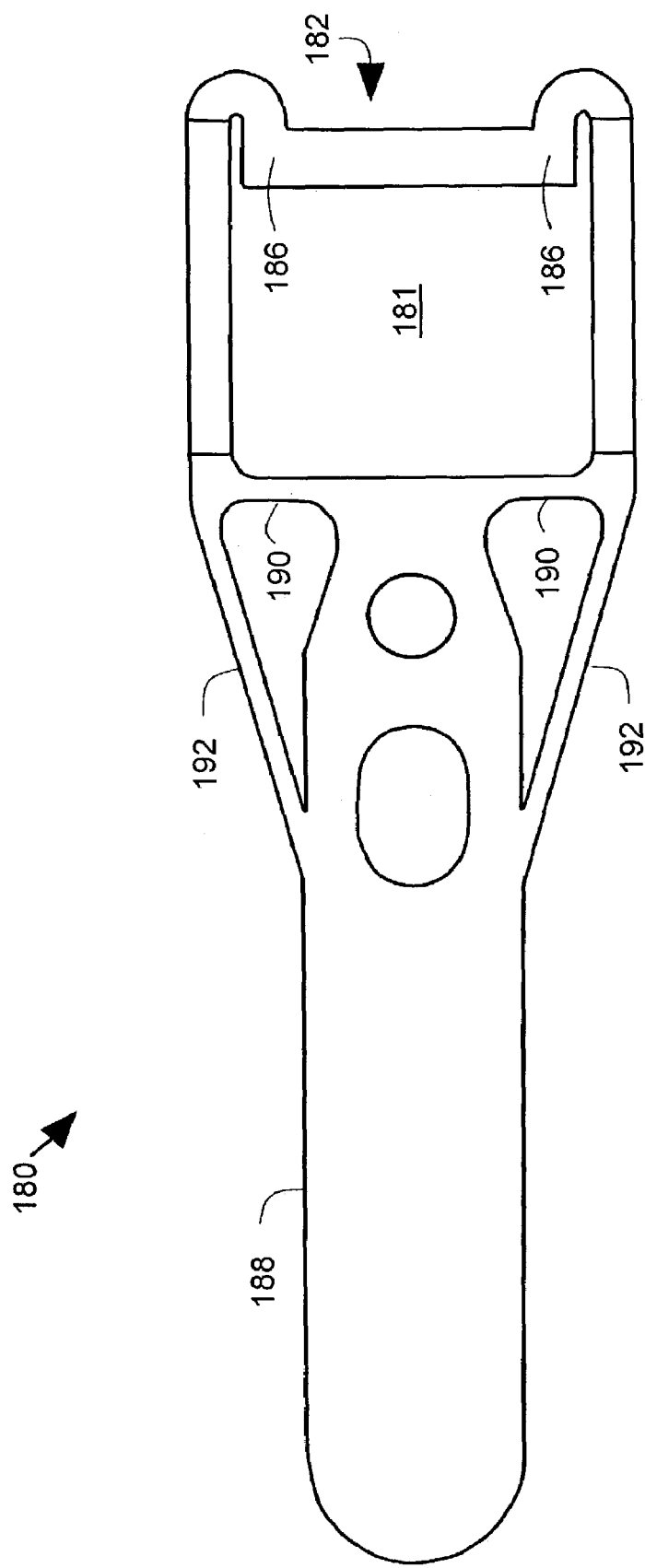
FIG. 3 illustrates a bottom view of a gimbal strut.

FIG. 3 illustrates a bottom view of a gimbal strut 180. Gimbal strut 180 is typically formed of stainless steel. Gimbal strut 180 has a main body 188 that extends to a pair of braces 192 and a pair of tethers 190, which support a bridge 182 at the end of the gimbal strut 180. Gimbal strut 180 includes an opening 181, which aligns with the opening in the window frame 162 in FIG. 2. The bridge 182 has bridge regions 186 that are later bonded to a microactuator as described below in connection with FIGS. 4 and 5. The gimbal strut 180 of FIG. 3 is assembled with the beam 140 of FIG. 2 as described below in connection with FIG. 4.

Figure 4:
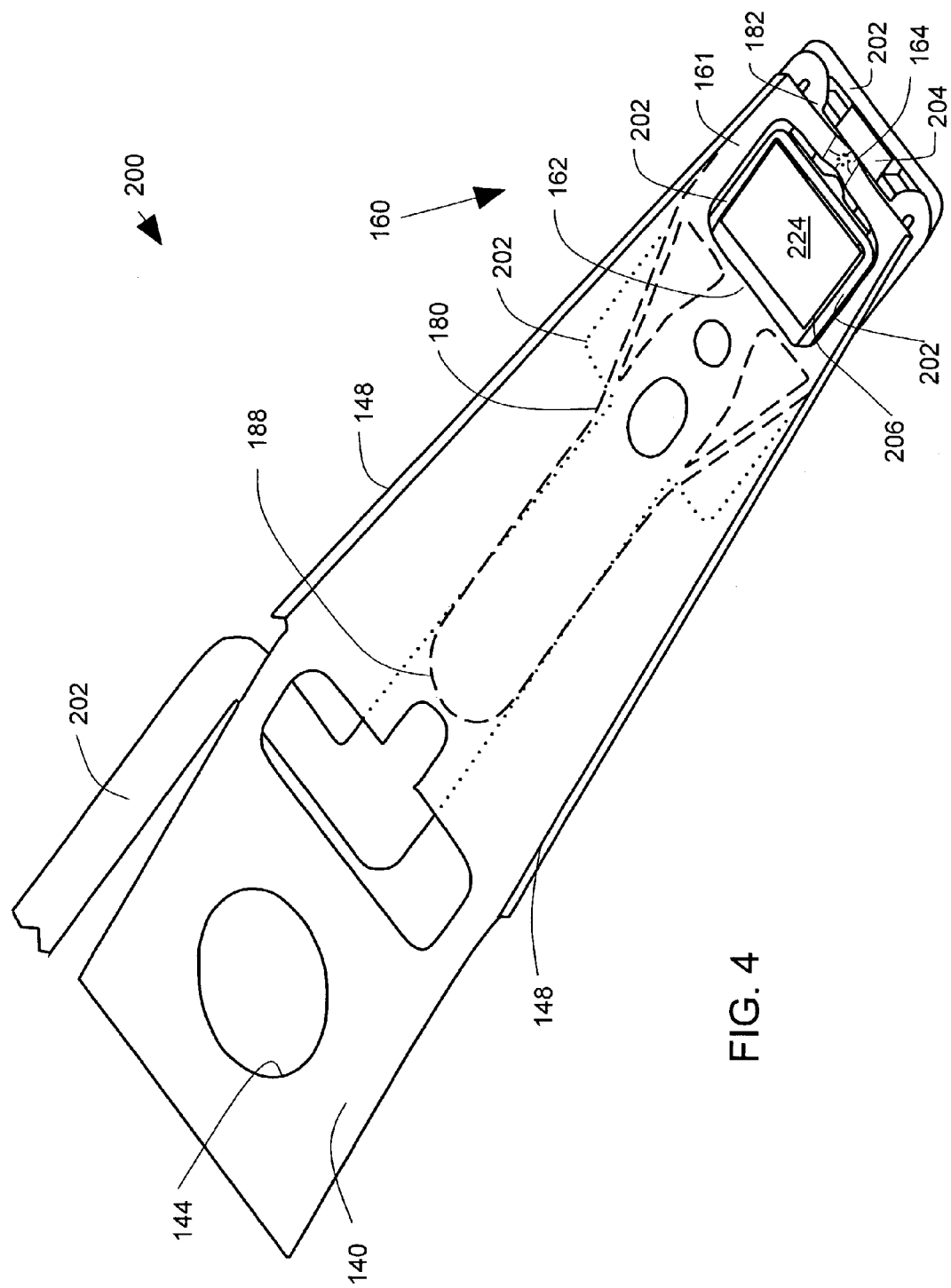
FIG. 4 illustrates a top view of an assembly of a load beam, gimbal strut, flex circuit, microactuator and head.

FIG. 4 illustrates a top view of a head gimbal assembly 200 that corresponds generally with a suspension 112 and slider 110 illustrated in FIG. 1. Head gimbal assembly 200 includes the load beam 140 of FIG. 2 and the gimbal strut 180 of FIG. 3. Reference numbers used in FIG. 4 that are the same as reference numbers used in FIGS. 2–3 identify the same features.

The head gimbal assembly 200 also includes a flex circuit 202 that is electrically connected to a microactuator 206 and a read/write head 204 in the head gimbal assembly 200. The microactuator 206 includes a microactuator main body 224 that is surrounded by the window frame 162. The assembly of the head gimbal assembly 200 near the second end 160 of the load beam 140 is somewhat complex, and is enlarged and illustrated in more detail below in FIG. 5.

Figure 5:
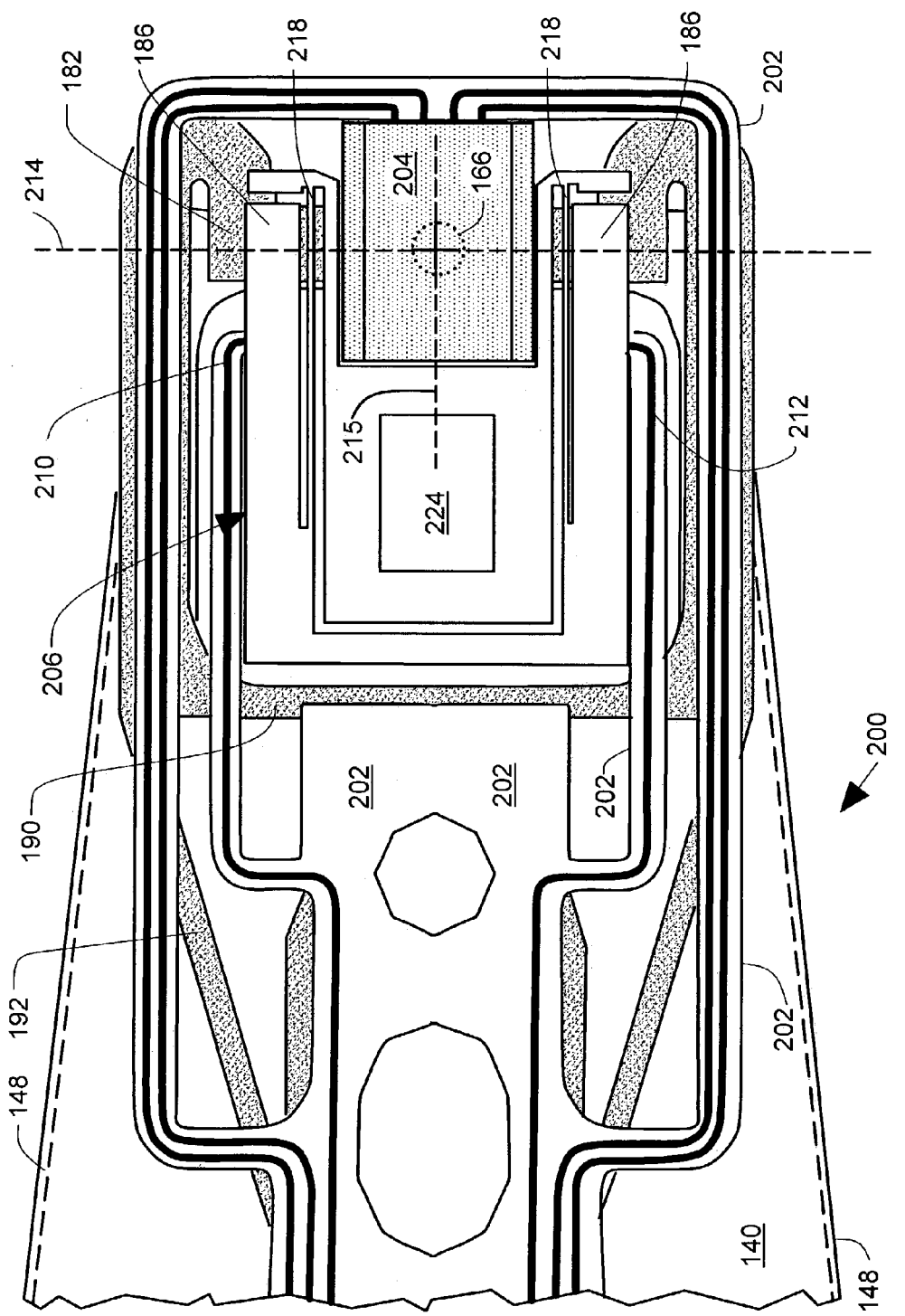
FIG. 5 illustrates a detailed bottom view of a portion of the assembly illustrated in FIG. 4.

FIG. 5 illustrates a detailed bottom view of a portion of the head gimbal assembly 200 at the second end 160 of the load beam 140. The view in FIG. 5 is taken from the side that faces disc 126 in FIG. 1. Reference numbers used in FIG. 5 that are the same as reference numbers used in FIGS. 2–4 identify the same features.

The flex circuit 202 has connections 210 and 212 that turn inwardly to make connection to electrical contacts of the microactuator 206. The microactuator 206 is bonded to the bridge 182 at regions 186. The microactuator 206 is also bonded to the read/write head 204. The microactuator 206 includes thin flex arms 218 that allow for relative motion between the read/write head 204 and the bridge 182 when the microactuator 206 is actuated. As illustrated in FIG. 5, the read/write head 204 has a pitch axis 214 and a roll axis 215 aligned with preload dimple 166.

The head gimbal assembly 200 described above in connection with FIGS. 4–5 is useful as an operational component of a disc drive.

Figure 6:
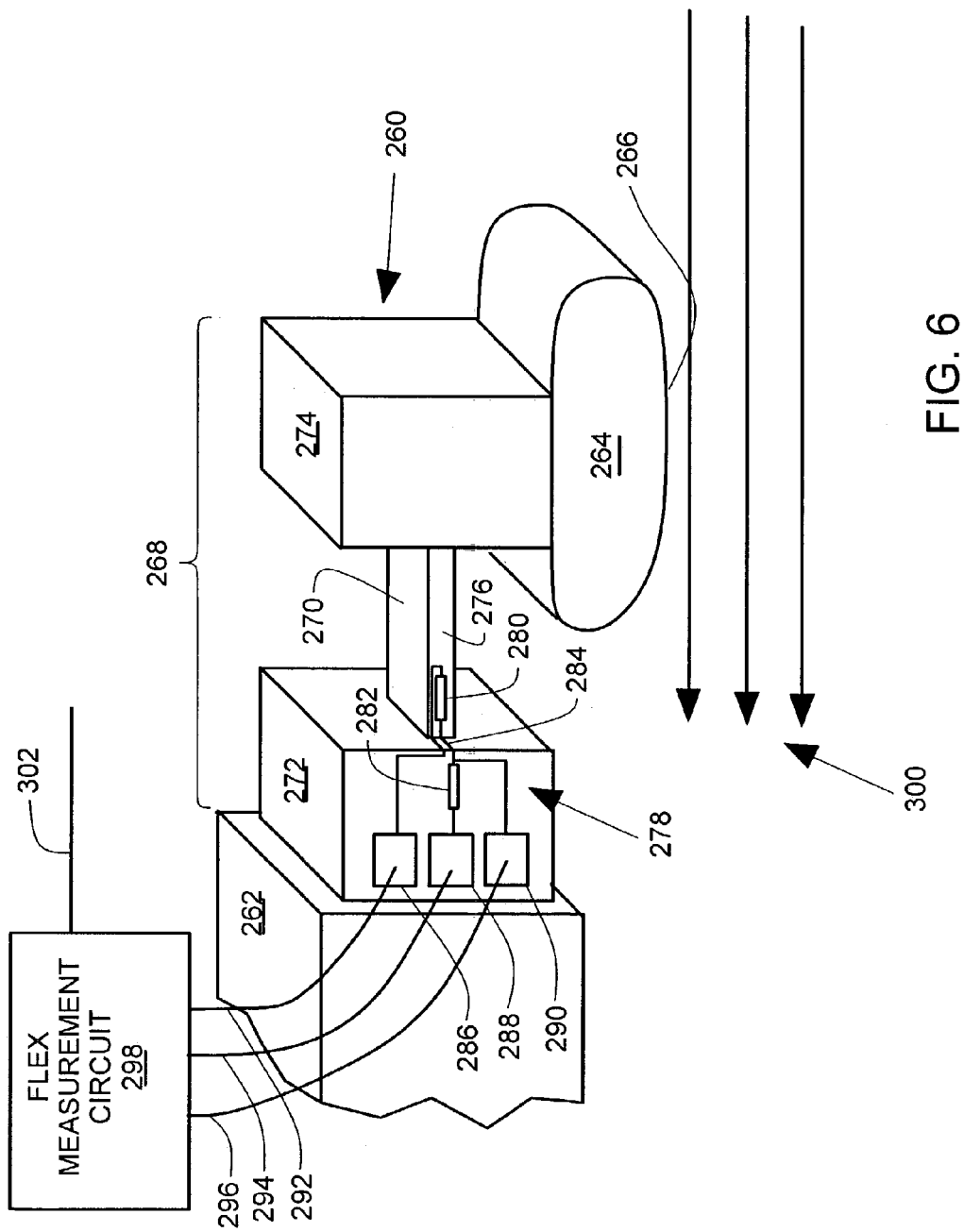
FIG. 6 illustrates a micromechanical assembly coupled between a positioning member and a body with an aerodynamic surface.

FIG. 6 illustrates a micromechanical assembly 260 coupled between a positioning member 262 and a body 264 that includes an aerodynamic surface 266. The micromechanical assembly 260 is assembled using lithographic pattern methods to shape a substrate 268 from a wafer and to lithographically deposit electrical circuitry 278 on the substrate. The term "lithographic pattern," as used in this application, includes electrical circuitry that is formed using integrated circuit manufacturing techniques. These techniques include, for example, sputtering and thin film processes, thick film processes, microelectromechanical system (MEMS) processes, microstructure fabrication, diffusion, microsystem technology (MST), depositions from gasses, vapors and liquids, lift off techniques, microgalvanic techniques, nanostructure fabrication techniques, self-assembly techniques and other techniques used to shape or deposit miniature circuits on substrates. The use of lithographic pattern processes avoids the use of fasteners and adhesives and allows manufacture of a micromechanical assembly 260 as a test device that has mechanical properties that closely replicate the mechanical properties of a lithographically patterned functional component such as a microactuator.

The micromechanical assembly 260 includes the substrate 268. The substrate 268 includes a flexible beam 270 joining a first substrate portion 272 that attaches to the positioning member 262 to a second substrate portion 274 that attaches to the body 264. The substrate 268 can be formed from a wafer of silicon and shaped, for example, by reactive ion etching as described below in connection with FIGS. 8A–8B. The substrate is a unitary, integral shaped block of material that is free of joints or other irregularities that could undesirably produce hysteresis in strain measurements. The substrate 268 includes a substrate surface 276 for receiving lithographically patterned circuitry. The substrate surface 276 extends at least over a portion of the flexible beam 270 and preferably extends onto a portion of one or more of the substrate portions 272, 274. In some cases the surface 276 can be a single flat surface, and in other cases the surface 276 can be more complex.

The lithographic patterned circuit 278 is formed on the substrate surface 276. The lithographic pattern includes a first impedance element 280 that senses flexing of the flexible beam 270 and a second impedance element 282 that is electrically coupled, preferably by a lithographically patterned lead 284 to first impedance element 280. Contact pads 286, 288, 290 electrically couple to the lithographic pattern 270. The contact pads 286, 288, 290 connect to flexible leads 292, 294, 296 for coupling to a flex measurement circuit 298. The lithographically patterned circuit 278 and the contact pads 286, 288, 290 can be formed, for example, by processes described below in connection with FIGS. 9, 11A–11E, 12A–12E, 13A–13E. The use of a lithographically patterned circuit 278 and lithographically patterned contact pads 286, 288, 290 provides a complete assembly 260 with a mass and other mechanical characteristics that are substantially the same as the mass and other mechanical characteristics of the substrate 268 alone.

The positioning member 262 is moved to position the body 264 such that the aerodynamic surface 266 interacts with a fluid flow 300, typically an air flow that is similar to the air flow that the body 264 encounters during normal use of body 264. Aerodynamic forces result from the interaction of the body 264 and the fluid flow 300. The aerodynamic forces are transmitted through the micromechanical assembly 260, flexing the flexible beam 270. The first impedance element 280 varies and senses the strain in the flexible beam 270. In a preferred arrangement, the first impedance element 280 in arranged in a half-bridge arrangement with the second impedance element 282 as illustrated. The second impedance element 282 is positioned on the surface 276 in a location where it experiences strain that is different than the strain experienced by the first impedance element 280.

In one preferred arrangement, the second impedance element 282 is positioned in a location that is relatively free of strain, such as on substrate 272 or 274. In another preferred arrangement, the second impedance element 282 is positioned in a location that experiences compressive strain when the first impedance element experiences tensile strain. In yet another preferred arrangement, the first impedance element 280 is arranged in a zigzag or serpentine pattern to provide increased sensitivity. In another preferred arrangement, the first and second impedance elements 280, 282 have similar patterns and are formed of the same material to provide temperature compensation.

The flex measurement circuit 298 provides electrical excitation on leads 292, 294 and receives a sense output from the half bridge on lead 296. The flex measurement circuit 298 provides an amplified output on line 302 that is useful in testing various configurations of body 264 under various conditions of flow 300 in combination with various positions of positioning members 262. In one preferred arrangement, the micromechanical assembly 260 is geometrically shaped to fit into a location in a test fixture which is mechanically comparable to the location of a microactuator in a disc drive. The test fixture can be used for design testing of air bearing surface shapes on read/write heads in combination with various types of gimbal struts and load beams, for example those described above in connection with FIGS. 2–5. In another preferred arrangement, the micromechanical assembly 268 is used to sense aerodynamic forces applied to the aerodynamic surface of a body 264 that is a read/write head mounted in a test fixture that is mechanically comparable to the arrangement described above in connection with FIGS. 2–3. Another example of a micromechanical assembly that can be used in test fixtures is described below in connection with FIGS. 7A–7B.

Figure 7A:
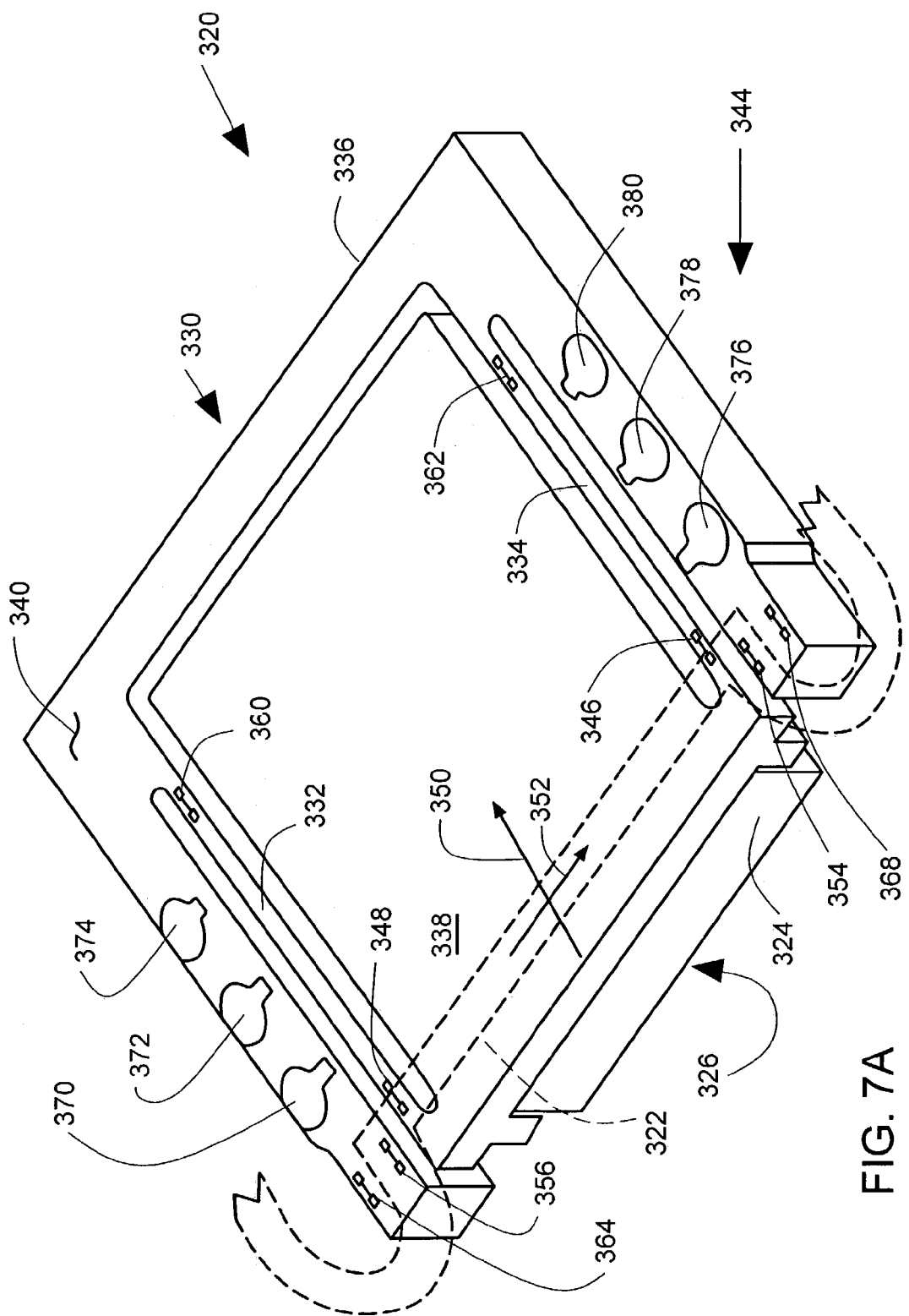
FIG. 7A illustrates a micromechanical device adapted to sense vertical load, roll torque and pitch torque.

FIG. 7A illustrates a micromechanical assembly 320 that is geometrically shaped to fit in a location in a test fixture which is mechanically comparable to the location of a microactuator in a disc drive. The micromechanical assembly 320 can be geometrically shaped to be comparable to the microactuator 206 described above in connection with FIGS. 4–5. The micromechanical assembly 320 includes circuitry that permits testing and evaluation of aerodynamic or suspension forces in a test fixture that is similar to the arrangement illustrated in FIGS. 2–3 in order to test and compare various configurations. In particular, micromechanical assembly 320 can be arranged to measure forces that indicate roll torque, pitch torque and vertical load.

The micromechanical assembly 320 is couplable between a positioning member 322 (shown in dashed lines in FIG. 7A) and a body 324 subject to varying forces. As illustrated in FIG. 7A, the positioning member 322 can comprise a test fixture similar to the load beam and gimbal strut described above in connection with FIGS. 2–3. As illustrated in FIG. 7A, the body 324 can be geometrically similar to a read/write head such as read/write head 204 described above in connection with FIGS. 4–5. The body 324 includes an air bearing surface 326 and is subject to varying forces due to aerodynamic interaction with air flow on a spinning disc in a disc drive, for example.

A substrate 330 includes first and second flexible beam 332, 334 joining a first substrate portion 336 that attaches to the positioning member 322 to a second substrate portion 338 that attaches to the body 324. The first substrate portion 336 preferably comprises a frame. The second substrate portion 338 preferably comprises a read/write head (slider) mounting element. The substrate 330 includes a top substrate surface 340 that extends over the tops of the flexible beams 332, 334, and the first and second substrate portions 336, 338. The first substrate surface 340 is preferably flat as illustrated in FIG. 7A. The substrate 330 is preferably formed from a wafer by a lithographic pattern process such as the one described below in connection with FIGS. 8A–8B, for example.

A lithographic pattern 334 is formed on the substrate surface 344. The lithographic pattern 334 includes first and second impedance elements 346, 348 that sense flexing of the flexible beams 332, 334 due to the varying forces relative to roll and pitch axes 350, 352. The lithographic pattern 334 also includes third and fourth impedance elements 354, 356 that are electrically coupled to first and second impedance elements 346, 348 respectively. Additional sensing impedance elements 360, 362 are coupled to additional impedance elements 364, 368 to provide additional sensing and better resolve measurement of forces. The lithographic pattern 334 includes interconnecting leads (not illustrated in FIG. 7A) that connect to contact pads 370, 372, 374, 376, 378, 380 that are lithographically patterned on the surface 340. The contact pads couple to a flex measurement circuit as described below in connection with FIG. 7B.

The sense resistors and support beams are laid out so that all four impedance elements 346, 348, 360, 362 are equally stressed (in magnitude, not sign) when a load force is centered over the slider. A load force concentrated at the trailing edge shifts the stress to the leading end of the beams, and loading the slider at the leading edge shifts the stress to the resistors at the trailing edge. Shifting the load to one side or the other shifts the stress to impedance elements on the same side as the load shift.

Figure 7B:
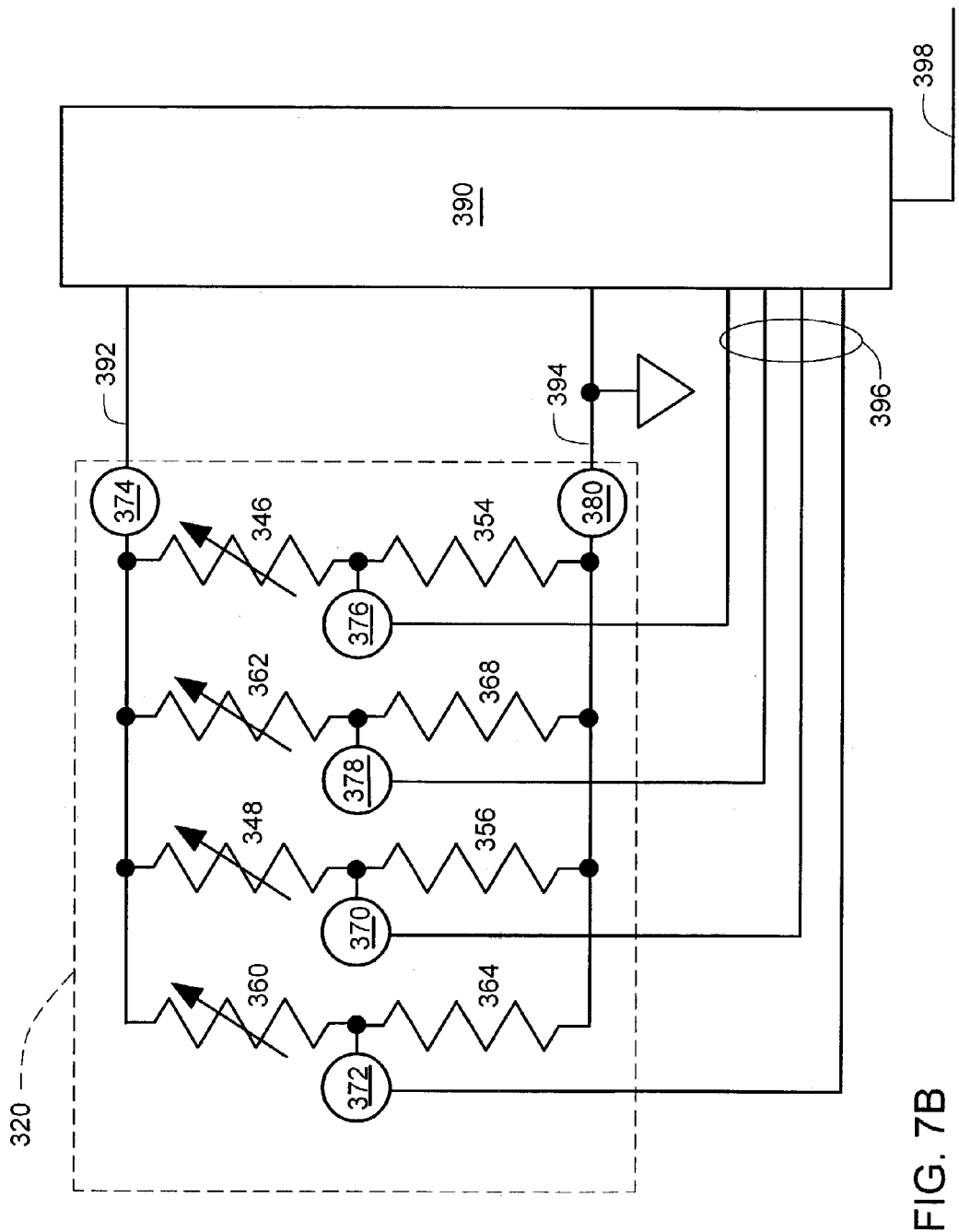
FIG. 7B illustrates an electrical schematic diagram of circuitry illustrated in FIG. 7A.

FIG. 7B illustrates an electrical schematic diagram of circuitry illustrated in FIG. 7A. Reference numbers used in FIG. 7B that are the same as reference numbers used in FIG. 7A identify the same or similar features. Each of four piezoresistive force sensor circuits comprises a half bridge circuit (series resistive voltage divider) as illustrated. Typically a piezoresistive strain sensor, such as 360 is connected in series with a temperature compensating reference resistor, such as 364 to form a half bridge circuit. However, resistor 364 can also be another piezoresistive strain sensor that has an equal and opposite strain sensitivity as piezoresistive strain sensor 360. Forces that are transmitted through the micromechanical assembly 320 deform the beams 332, 334. Preload forces (vertical loads) can be conveniently measured and measured forces can be mathematically combined to calculate roll and pitch torques.

The resistors (both strain sensor and compensation resistors) are N-type, and formed by doping a P-type wafer. Electrical isolation between the resistors is provided by the diode junctions formed by the N-type resistors and the P-type substrate, as the resistors form the cathodes of the diodes so the diodes will be reverse biased. The positions of the piezoresistors on the flex beams can be adjusted to optimize measurement of a desired parameter. Rather than being centered, the piezoresistors can be positioned toward the edge of the beam to sense off track motion. To get sensitivity to friction, beams can be rotated with resistors near the edge of the beams.

A flex measurement circuit 390 couples electrical excitation along lines 392, 394 to contact pads 374, 380. Voltages at contact pads 370, 372, 376, 378 represent measured strains and are coupled along lines 396 to the flex measurement circuit 390. The flex measurement circuit 390 generates amplified outputs at 398 that represent the various measured strains. In a preferred embodiment, the flex measurement circuit 390 mathematically combines the measured strain outputs in order to resolve and provide amplified outputs representing translational forces and rotational torques on multiple axes.

The micromechanical assembly 320 can be used to detect very small asperities causing off-track motions that would not be detectable by an acoustic emission sensor. Because the motions can be measured while the head is flying, contact with asperities and the disc avalanche can be detected through changes in the force distribution of the sensors. The beams can be optimized to detect preload, pitch torque, and roll torque, or to detect force changes due to contact.

FIGS. 8A–8B schematically illustrate deep reactive ion etch (DRIE) process steps in shaping a micromechanical device 410. Micromechanical device 410 includes piezoresistors 412 (such as those described above in connection with FIGS. 7A–7B) that are lithographically patterned in a substrate 414. In a first process illustrated in FIG. 8A, a lithographically patterned mask 416 is applied to a bottom surface 418 of the substrate 414 and lithographically patterned grooves 420, 422, 424, 426 are etched into the substrate 414. The DRIE process is preferred because it allows well defined vertical walls to be etched. In a second process illustrated at FIG. 8B, similar to the process illustrated in FIG. 8A, lithographically patterned grooves 428, 430 are etched from a top surface 432 of the substrate 414. The DRIE processes allow extremely complex shapes to be formed at a wafer level in multiple devices on the wafer. After the piezoresistors 412 and associated electrical interconnections are formed, the substrate 414 is etched in a two sided DRIE process to define a 200 micrometer thick frame and 100 micrometer thick flexible beams and central head mounting portion.

Figure 9:
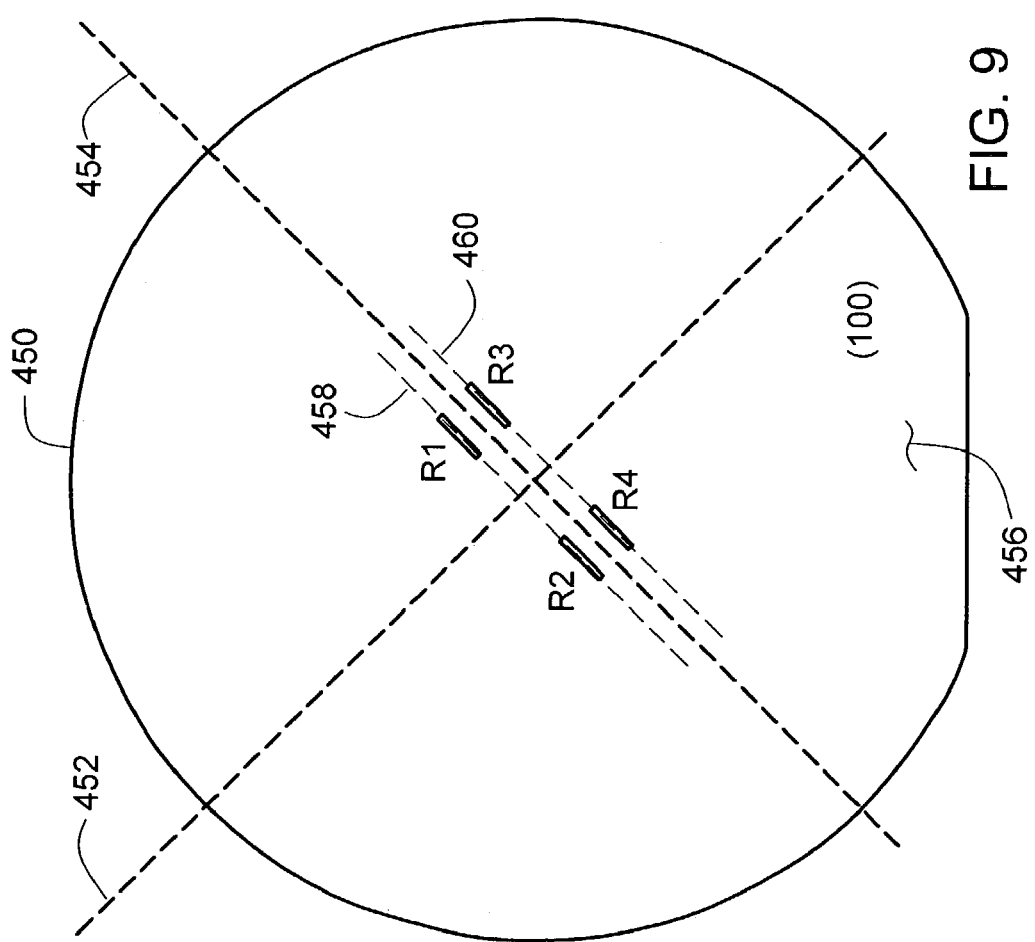
FIG. 9 illustrates orientation of strain gages to crystal axes on a single crystal silicon wafer.

FIG. 9 illustrates a preferred orientation of piezoresistive strain gages R1, R2, R3, R4 to crystal axes 452, 454 on a doped single crystal silicon wafer 450. The single crystal silicon wafer has a generally face-centered cubic structure with three crystallographic axes at right angles to one another. A wafer surface 456 is aligned parallel with a crystallographic plane designated (100) as illustrated. The piezoresistive strain gages have length axes 458, 460 that are aligned parallel with axis 454 and perpendicular to axis 452 as illustrated. FIG. 9 shows the preferred orientation of the piezoresistors on the (100) silicon wafer. The orientation shown is preferred to obtain the maximum sensitivity. If the piezoresistors are parallel or perpendicular to the 45 degree flat at the bottom of wafer 450 rather than parallel or perpendicular to the crystallographic axes, then sensitivity is reduced to only 30% of maximum value at the preferred orientation. After implantation, the wafers are annealed to remove damage caused by the implantation.

To avoid excessive spreading of the doped region, the diffusion depth introduced by the annealing step is kept small, but not so small as to create electrical breakdown at the desired 12V operating level. The breakdown voltage is selected to be about 25 to 30 volts. A drive in diffusion/anneal of 9 hrs at 900 degrees Centigrade is preferred.

FIG. 10 illustrates an enlarged plan view of the strain gage 348 in FIG. 7A formed on a micromechanical device substrate 330. The piezoresistive strain gage 348 preferably has dimensions of 5 micrometers by 50 micrometers and is doped to have a sheet resistivity of 800 ohms per square to provide a nominal resistance of 8000 ohms. The ends of strain gage 348 terminate in more heavily doped regions 470 that are electrically contacted by a lithographically patterned top level metalizations 472. The top level metalizations 472 contact buried interconnect metalizations 474 for connection to other circuit elements.

Figure 11A:
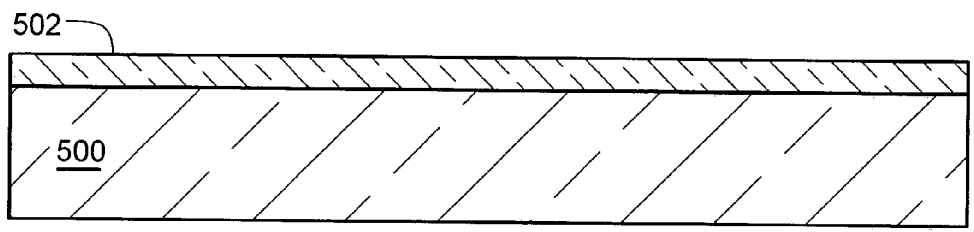
FIGS. 11A–11E illustrate cross sectional views of process steps in forming a lithographic pattern on a substrate of a micromechanical device.
Figure 11B:
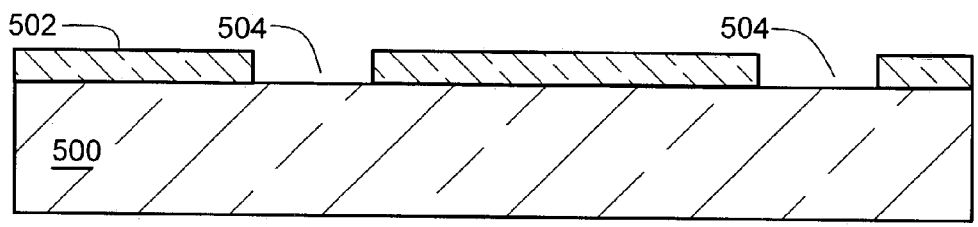
Figure 11C:
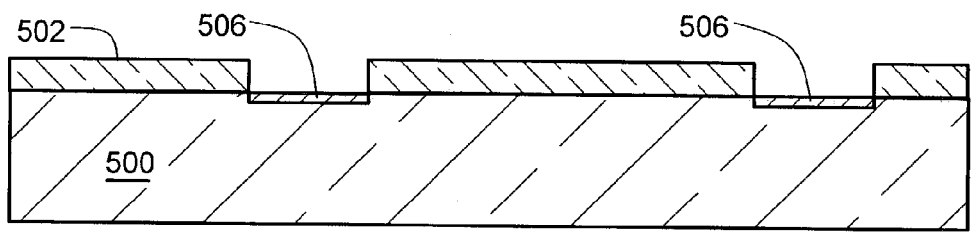
Figure 11D:
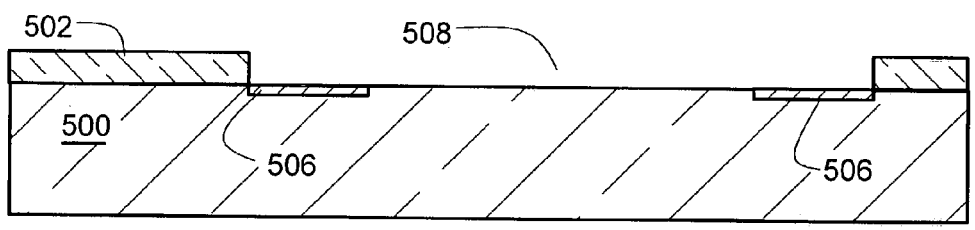
Figure 11E:
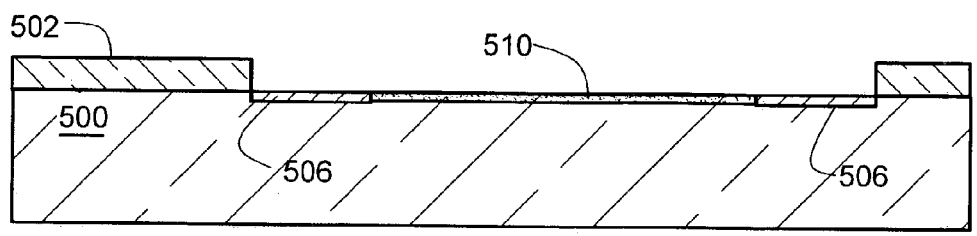

FIGS. 11A–E and FIGS. 12A–E illustrate cross-sectional views of process steps in forming a lithographic pattern of a circuit on a substrate 500 of a micromechanical device. In FIG. 11A, An oxide film 502 is formed on the P type silicon wafer substrate 500. The oxide film serves 502 as a resist. In FIG. 11B, lithographically patterned windows 504 are etched through the oxide film 502 in preparation for implanting N+ contacts. In FIG. 11C, N+ phosphorus ion contacts 506 are implanted through the windows 504. In FIG. 11D, a second window 508 is etched in the oxide film 502 in preparation for piezoresistor ion implantation. In FIG. 11E, N type phosphorus ion implantation is used to form piezoresistor 510 that extends over phosphorus ion implanted contacts 506. After completion of the process illustrated in FIG. 11E, processing continues as described below in connection with FIGS. 12A–12E.

Figure 12A:
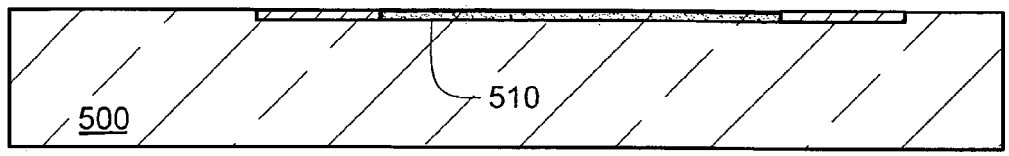
FIGS. 12A–12E illustrate cross sectional views of process steps in forming a lithographic pattern on a substrate of a micromechanical device.
Figure 12B:
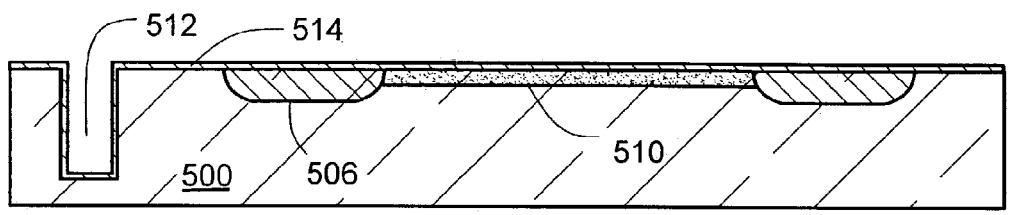
Figure 12C:
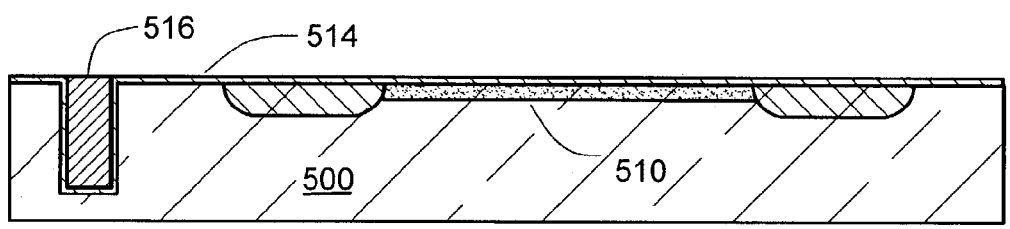
Figure 12D:
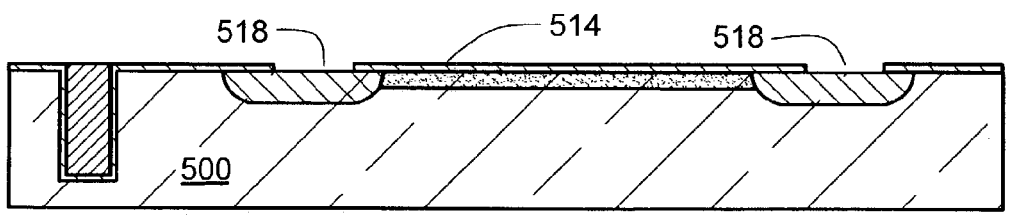
Figure 12E:
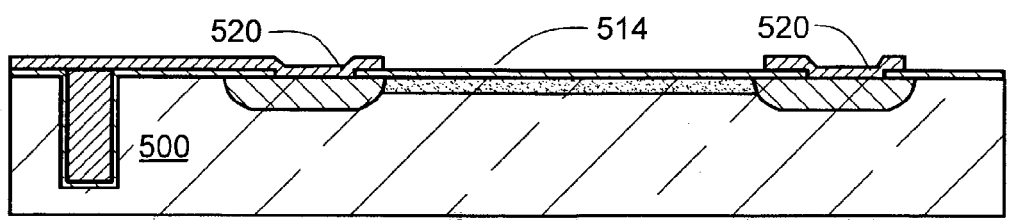

FIGS. 12A–12E illustrate process steps in forming a lithographic pattern on a substrate of a micromechanical device. In FIG. 12A, the oxide film 502 is removed to provide a planar surface for subsequent processing steps. The wafer is annealed after the process illustrated in FIG. 12A. In FIG. 12B a trench 512 is etched and a top surface nitride oxide layer 514 is applied using LPCVD in preparation for a buried interconnect. In FIG. 12C, a buried interconnect metalization 516 is deposited. In FIG. 12D, electrical contact windows 518 are etched in the silicon nitride film 514. In FIG. 12E, a top interconnect layer 520 is deposited and then etched to provide the desired pattern.

Figure 13A:
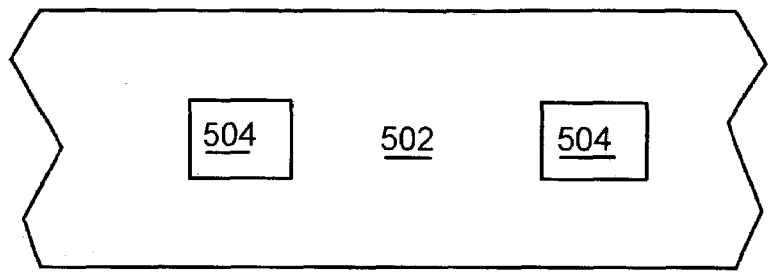
FIGS. 13A–E illustrate process steps in forming a lithographic pattern on a substrate of a micromechanical device.
Figure 13B:
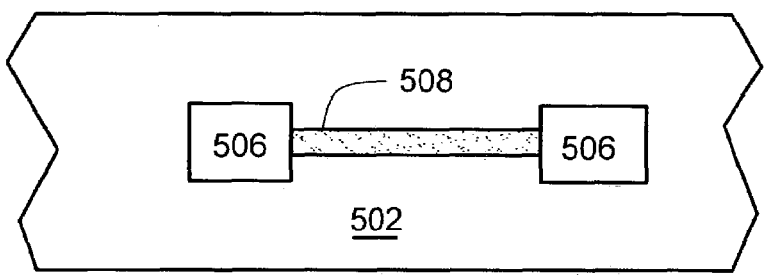
Figure 13C:
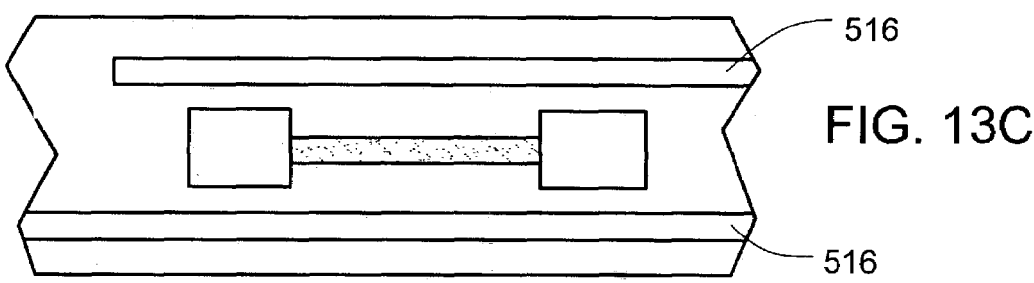
Figure 13D:
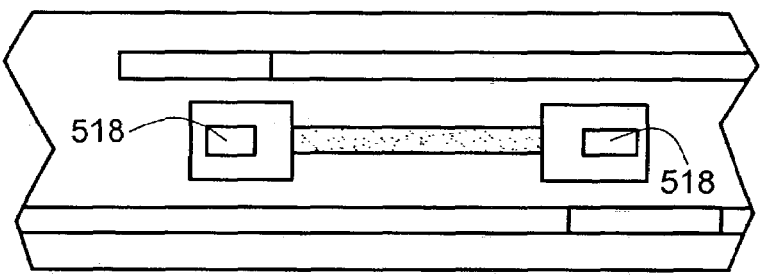
Figure 13E:
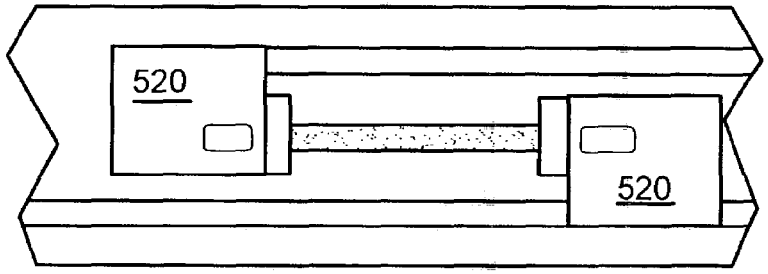

FIGS. 13A–13E illustrate plan views of the process steps illustrated in FIGS. 11A–11E, 12A–12E. FIG. 13A illustrates the pattern of oxide mask window 504 shown in FIG. 11B. FIG. 13B shows the mask window 508 for creating the N doped piezoresistors that is illustrated in FIG. 11D. The regions 506 already implanted for the contacts also receive the second dose for the resistors. FIG. 13C shows the buried interconnect metalization pattern 516 illustrated in FIG. 12C. FIG. 13D shows the contact windows 518 shown in FIG. 12D. FIG. 13E shows the patterned top level metalization 520 shown in FIG. 12E.

Figure 14:
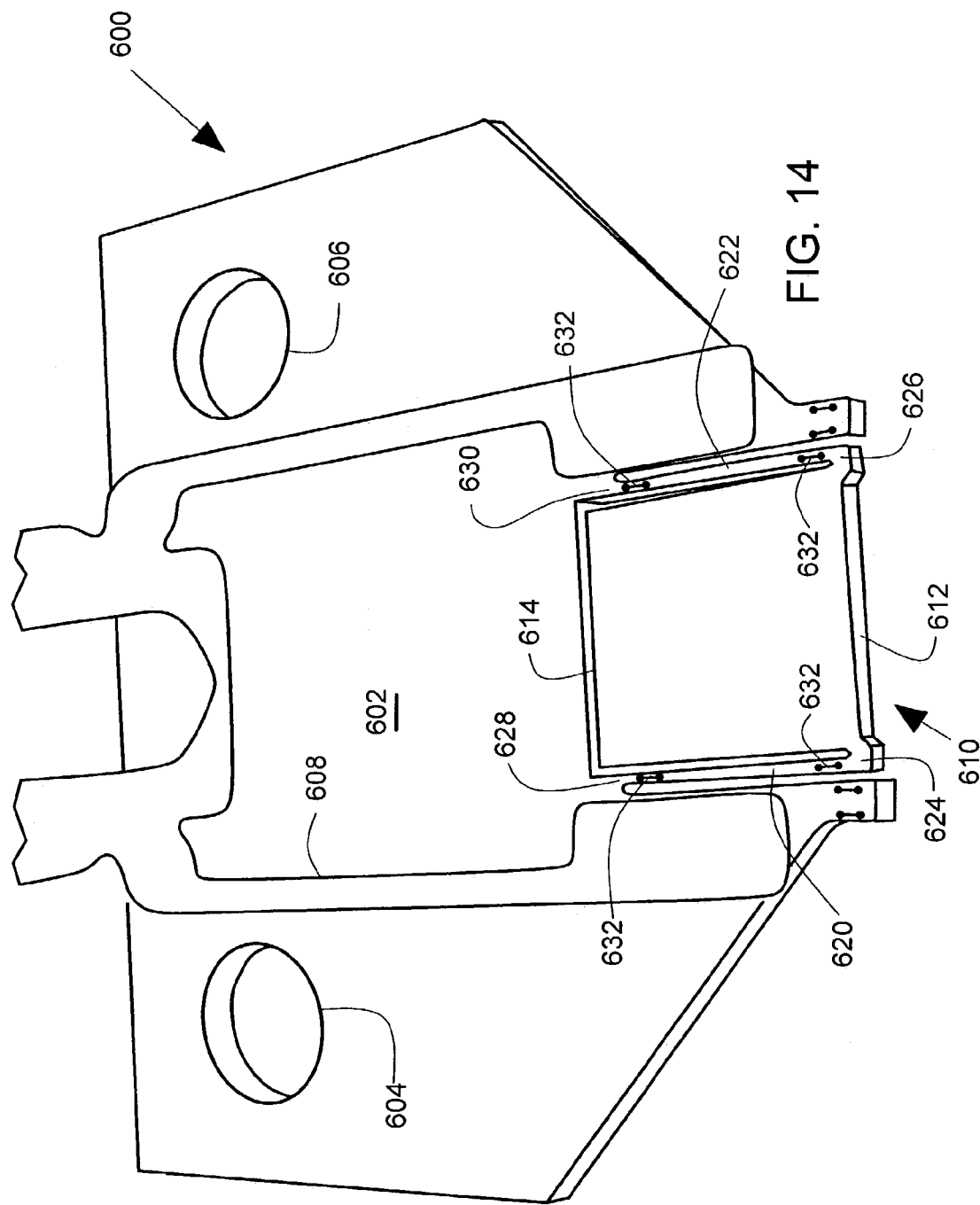
FIG. 14 illustrates a top oblique view of a micromechanical test fixture.
Figure 15:
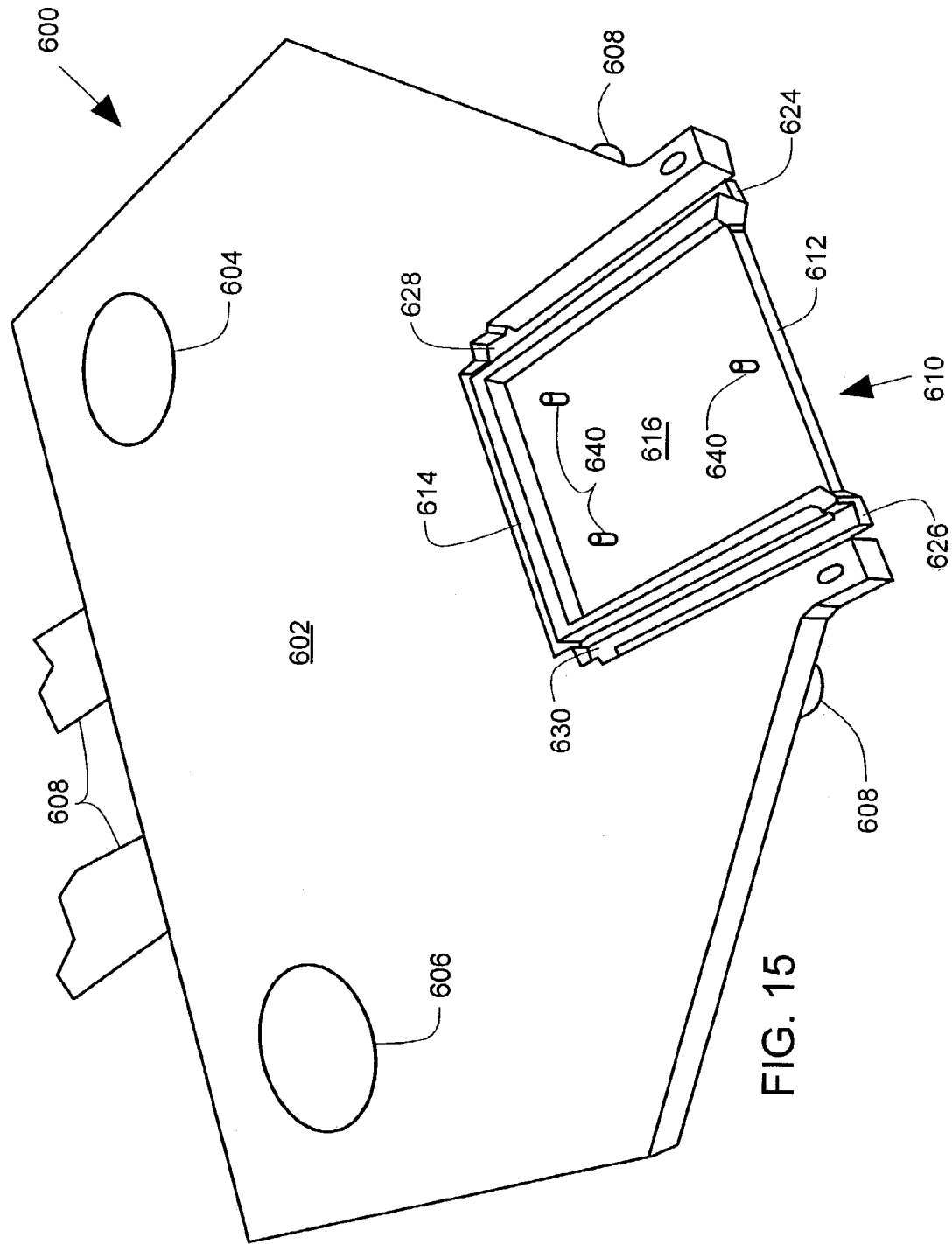
FIG. 15 illustrates a bottom oblique view of a micromechanical test fixture.

FIGS. 14–15 illustrate top and bottom oblique views of a micromechanical test fixture 600. The test fixture 600 can be used in conjunction with a head-gimbal assembly such as the head-gimbal assembly 200 illustrated in FIGS. 2–5. The test fixture 600 can be positioned to contact and support a bottom air bearing surface of read/write head 204 in the head gimbal assembly. The test fixture 600 can be used to sense forces that the read/write head 204 exerts on the test fixture 600. The test fixture 600 provides a sensitive ex-situ "testing platform" upon which the slider of an HGA could be lowered to characterize the HGA's torques and preload forces in the loaded condition.

The test fixture 600 includes a fixture body portion 602 that is adapted to attach to a positioning member (not illustrated). The fixture body portion 602 includes mounting holes 604, 606 for securely mounting the fixture body portion to the positioning member. A flexible printed circuit 608 provides electrical connections between contact pads on the fixture body portion 602 and a flex sensing circuit (not illustrated).

The test fixture 600 also includes a floating portion 610 that extends from a leading edge 612 to a trailing edge 614. The floating portion includes a test platform 616 (FIG. 15) between the leading edge 612 and the trailing edge 614.

First and second flexure beams 620, 622 have leading edges 624, 626 joined to the leading edge 612 of the floating portion 610. The first and second flexure beams 620, 622 have trailing edges 628, 630 that are joined to the fixture body portion 602. The first and second flexure beams have elongated lengths between their leading and trailing edges. The first and second flexure beams 620, 622 are interposed between the fixed body portion 602 and the floating body portion 610 to flex in response to movement of the floating portion 610 relative to the fixture body portion 602. A plurality of piezoresistive sensors 632 on the flexure beams 620, 622 sense flexure of the flexure beams. Contact can be made with a read/write head on platform 616 or on optional three point landing pads 640. The platform 616 or the landing pads 640 can be coated, depending on the application, to adapt to static discharge and cleanliness requirements of the application.

The test fixture 600 is a micromechanical device that is essentially similar to the micromechanical device 320 illustrated in FIGS. 7A–7B, except for its mechanical interfaces to other devices.

In summary, a micromechanical assembly (such as 320) couples between a positioning member (such as 322) and a body (such as 324) subject to varying forces. The micromechanical device comprises a substrate (such as 330) including a flexible beam (such as 332, 334) joining a first substrate portion (such as 336) attachable to the positioning member to a second substrate portion (such as 338) attached to the body. The substrate includes a substrate surface (such as 340) extending at least over the flexible beam. A lithographic pattern (such as 344) is formed on the substrate surface. The lithographic pattern includes first and second impedance elements (such as 346, 348, 360, 362) that sense flexing of the flexible beam due to the varying forces along corresponding first and second axes. The lithographic pattern also includes third and fourth impedance elements (such as 354, 356, 364, 368) that are electrically coupled to first and second impedance elements. The micromechanical assembly also includes contact pads (such as 370, 372, 374, 376, 378, 380) coupled to the lithographic pattern for coupling to a flex measurement circuit (such as 390).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the micromechanical system while maintaining substantially the same functionality without departing from the scope of the present invention. In addition, although preferred embodiments described herein are directed to read/write head applications, it will be appreciated by those skilled in the art that the teachings of the present invention can be applied to other data storage applications, without departing from the scope of the present invention.

What is claimed is:

1. A micromechanical assembly couplable to a member, the micromechanical assembly comprising:
   a body positionable in a fluid flow by the member, the body having an aerodynamic surface subject to aerodynamic forces from interaction of the aerodynamic surface with the fluid flow;
   a substrate including a beam joining a first substrate portion that is attachable to the member to a second substrate portion that is attached to the body, the substrate including a substrate surface extending at least over the beam;
   a pattern adjoining the substrate surface, the pattern including at least a first circuit element that senses flexing of the beam;
   contact pads coupled to the pattern and;
   a measurement circuit coupled to the contact pads, the measurement circuit providing an output as a function of the aerodynamic forces.

2. The micromechanical assembly of claim 1 wherein the pattern further comprises at least a second circuit element that is electrically coupled to the first circuit element.

3. The micromechanical assembly of claim 2 wherein the first and second circuit elements form a half bridge circuit.

4. The micromechanical assembly of claim 2 wherein the second circuit element is positioned in a location that is relatively free of strain.

5. The micromechanical assembly of claim 2 wherein the second circuit element is positioned in a location that experiences compressive strain when the first circuit element experiences tensile strain.

6. The micromechanical assembly of claim 1 wherein the first circuit element is formed in a zigzag pattern.

7. The micromechanical assembly of claim 2 wherein the second circuit element is formed of the same material as the first circuit element to provide temperature compensation.

8. The micromechanical assembly of claim 1 wherein the output comprises an amplified output representing the sensed flexing.

9. The micromechanical assembly of claim 1 further comprising a second beam.

10. The micromechanical assembly of claim 1 wherein the micromechanical assembly senses roll torque, pitch torque and vertical load.

11. The micromechanical assembly of claim 10 wherein the pattern comprises circuit elements disposed on unstressed regions of the substrate and that provide temperature compensation.

12. A micromechanical assembly couplable to a member, the micromechanical device comprising:
   a body positionable in a fluid flow by the member, the body having an aerodynamic surface subject to aerodynamic forces from interaction of the aerodynamic surface with the fluid flow;
   a substrate including a beam joining a first substrate portion that is attachable to the member to a second substrate portion that is attachable to the body; the substrate including a substrate surface extending at least over the beam;
   a pattern formed at the substrate surface, the pattern including first and second circuit elements that sense flexing of the beam due to the varying forces;
   contact pads coupled to the pattern and;
   a measurement circuit coupled to the contact pads, the measurement circuit providing an output as a function of the aerodynamic forces.

13. The micromechanical assembly of claim 12 wherein the pattern includes third and fourth circuit elements that are electrically coupled to first and second circuit elements respectively.

14. The micromechanical assembly of claim 13 wherein the first and third circuit elements form a half bridge circuit.

15. The micromechanical assembly of claim 13 wherein the third circuit element is positioned in a location that is relatively free of strain.

16. The micromechanical assembly of claim 13 wherein the third circuit element is positioned in a location that experiences compressive strain when the first circuit element experiences tensile strain.

17. The micromechanical assembly of claim 12 wherein the first circuit element is formed in a zigzag pattern.

18. The micromechanical assembly of claim 13 wherein the third and fourth circuit element are formed of the same material as the first and second circuit elements to provide temperature compensation.

19. The micromechanical assembly of claim 12 wherein the output comprises an amplified output representing the sensed flexing.

20. The micromechanical assembly of claim 12 further comprising a second beam.

21. The micromechanical assembly of claim 12 wherein the micromechanical assembly senses roll torque, pitch torque and vertical load.

22. A test fixture, comprising:
a body portion adapted to attach to a member;
a floating portion including a leading edge, a trailing edge and a test platform therebetween;
a body attached to the floating portion, the body being positionable in a fluid flow and having an aerodynamic surface subject to aerodynamic forces from interaction of the aerodynamic surface with the fluid flow;
a plurality of beams having a leading edge, a trailing edge and an elongated length therebetween, the plurality of beams being interposed between the body portion and the floating body portion to flex in response to movement of the floating portion relative to the body portion; and
a plurality of sensors on the beams to sense flexure of the plurality of beams, the plurality of sensors providing a sensor output as a function of the aerodynamic forces.

23. The test fixture of claim 22 wherein the plurality of sensors form a half bridge circuit.

24. The test fixture of claim 22 wherein at least one of the plurality of sensors is positioned in a location that is relatively free of strain.

25. The test fixture of claim 22 wherein a first one of the plurality of sensors is positioned in a location that experiences compressive strain when the a second one of the plurality of sensors experiences tensile strain.

26. The test fixture of claim 22 wherein the plurality of sensors comprises circuit elements formed in a zigzag pattern.

27. The test fixture of claim 22 wherein the plurality of sensors are formed of the same material to provide temperature compensation.

28. The test fixture of claim 22 wherein the sensor output comprises an amplified output representing the sensed flexure.

29. The test fixture of claim 22 further comprising contact pads.

30. The test fixture of claim 22 wherein the body portion has mounting holes.

31. The test fixture of claim 22 wherein the test fixture is arranged to test a head-gimbal assembly design and the test platform is adapted to contact a read/write head.

* * * * *